United States Patent [19]

Hope

[11] 3,975,958

[45] Aug. 24, 1976

[54] APPARATUS FOR LEVEL MEASUREMENT OF FREE FLOWING SUBSTANCES, SOLID SUBSTANCES OR COMBINATION OF THESE IN TANKS, CONTAINERS, RESERVOIR OR THE LIKE

[75] Inventor: Bjorn R. Hope, Lommedalen, Norway

[73] Assignee: Navaltronic A/S, Oslo, Norway

[22] Filed: Apr. 3, 1974

[21] Appl. No.: 457,399

[30] Foreign Application Priority Data

May 5, 1973 Norway.............................. 1400/73

[52] U.S. Cl............................................... 73/290 V
[51] Int. Cl.²......................................... G01F 23/28
[58] Field of Search....................... 73/290 V, 290 R

[56] References Cited
UNITED STATES PATENTS

| | | | |
|---|---|---|---|
| 3,100,994 | 8/1963 | Junger | 73/290 V |
| 3,133,442 | 5/1964 | Werner | 73/290 V |
| 3,170,094 | 2/1965 | Roth | 73/290 V X |
| 3,208,281 | 9/1965 | Kalmus et al. | 73/290 V X |
| 3,326,042 | 6/1967 | Ross et al. | 73/290 V |
| 3,394,589 | 7/1968 | Tomioka | 73/290 V |

FOREIGN PATENTS OR APPLICATIONS

| | | | |
|---|---|---|---|
| 1,026,482 | 6/1968 | U.S.S.R. | 73/290 V |

*Primary Examiner*—Richard C. Queisser
*Assistant Examiner*—John S. Appleman
*Attorney, Agent, or Firm*—Howson and Howson

[57] ABSTRACT

Apparatus for measuring the level of a substance in a container of substantial depth which is practical, efficient, and rugged. Sonic or acoustic waves are transmitted through relatively sonic-wave propagating members, from an emitter member immersed in the substance whose level is to be determined to a collector also immersed in that substance. For this purpose, a sonic generator applies waves to an emitter portion of the wave-propagating means, and a collector portion of the wave-propagating means collects such emitted waves and applies them to a detecting means for producing indications of the level of the substance. The detecting means provide such indications on the basis of the relationship between the emitted and collected waves. The emitter and collector are each in the form of a rigid member capable of longitudinal wave propagations and are of substantially U-shaped horizontal cross-section. The emitter and collector members are affixed to one another and to the container at the mode point of the members, and the means for applying and for detecting the waves are connected to the emitter and collector at the top ends thereof.

2 Claims, 14 Drawing Figures

PROIR ART

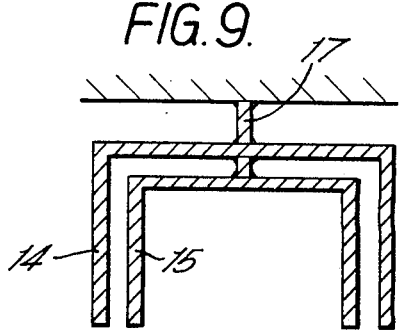
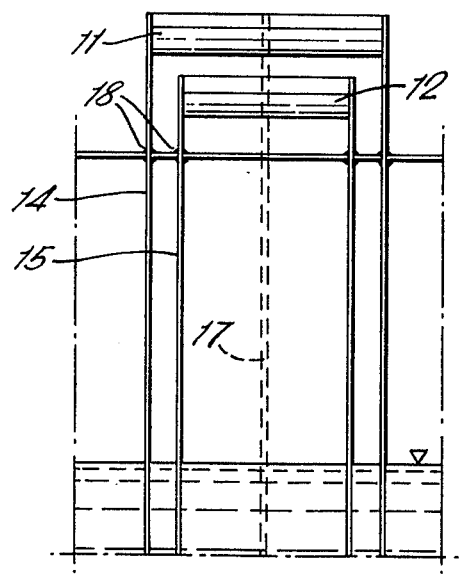
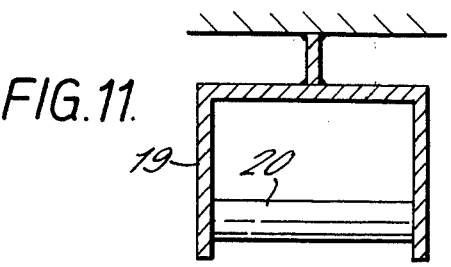
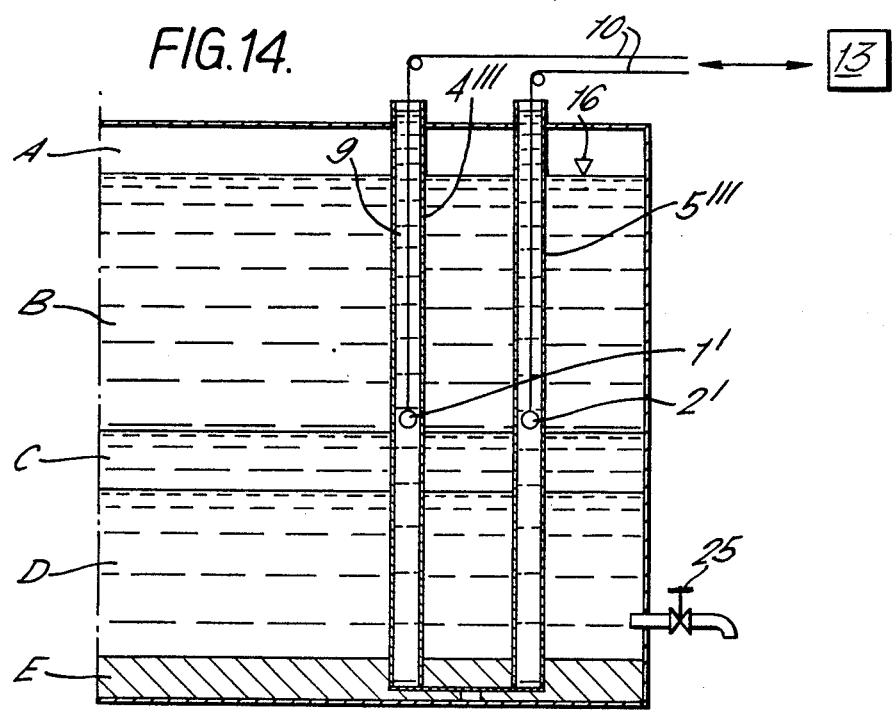

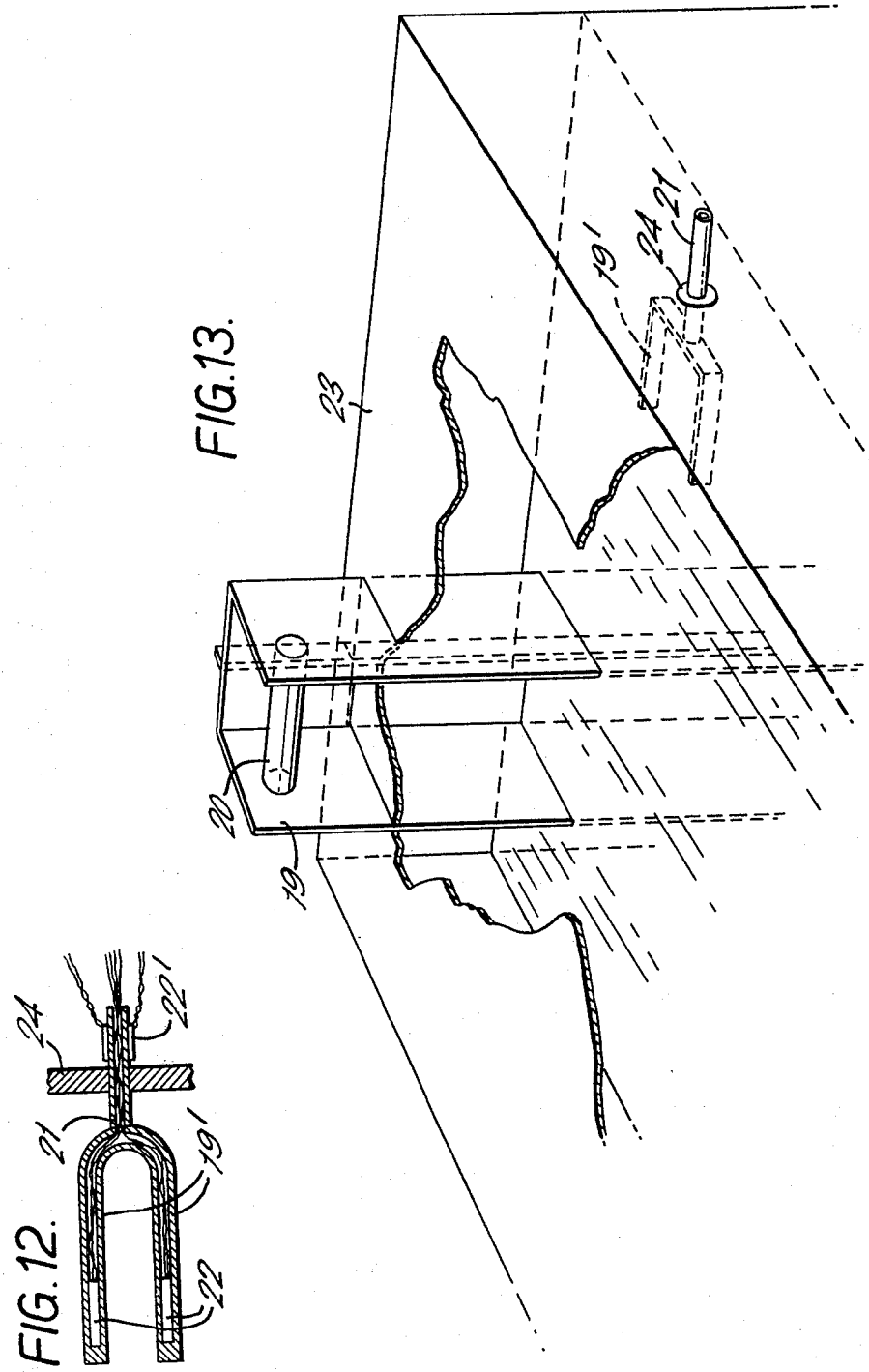

APPARATUS FOR LEVEL MEASUREMENT OF FREE FLOWING SUBSTANCES, SOLID SUBSTANCES OR COMBINATION OF THESE IN TANKS, CONTAINERS, RESERVOIR OR THE LIKE

The present invention relates to apparatus for level measurement of free-flowing substances, solid substances or combination of these in tanks, containers, reservoirs or the like. For the measurement of level, e.g. in tanks, there have previously been proposed several methods and several kinds of apparatus. A usual measuring method has been to arrange a float on top of the liquid or the like and to measure the vertical movement of the float. Since this method substantially is mechanical, it involves several measurement errors due to mechanical wear, expansion due to temperature etc. There have also been proposed optical systems where light rays are reflected from the liquid surface. The sources of errors are however numerous in this case and have a great effect on the measured result. Among the errors should be mentioned contamination of optical devices, false reflections from deeper layers in the liquid etc. Similarly it is known to use sound waves for measuring the level of a substance by emitting the said sound waves from a loudspeaker or the like and to measure the time elapsing before the sound waves are returned as an echo. These sound waves are picked up e.g. by means of a microphone. The reflection errors are however present to a large extent simultaneously with the accuracy of the method being dependent on both the medium in which the waves propagate and its temperature. Measurement by means of electro-magnetic waves will in quite a number of cases be an accurate method, but possesses the substantial disadvantage that it is quite expensive as are most of the above mentioned systems. The use of electro-magnetic waves has a limited field of utilization in the case where the medium which is to be measured possesses a high explosive potential, in which case the radiated effect of this king of waves must be very small. The method has thus little applicability in cases where the differences in level may be large, e.g. 90 feet, as e.g. in ship tanks. The attenuation of the electro-magnetic waves in the liquid or substance will also be a substantial factor which must be taken into account when calculating the radiated effect from the measurement transmitter.

The novel and characteristic features according to the present invention will become apparent from the descriptive part of the specification with reference to the accompanying drawings, as well as from the attached claims.

In the description hereinafter the substance which level is measured is denoted "the liquid", although it is of course immediately understood that the invention may be used for measuring the level of most known free-flowing substances, granulates (e.g. grains, corn, powder or the like), solid substances or combination of such substances.

The invention will now be described further with reference to the accompanying drawings, where:

FIGS. 9 and 10 illustrate a third embodiment of the apparatus according to the invention, shown in cross section and from the front respectively. The sound wave emitting and receiving devices are for sake of clarity not shown in FIG. 9, whereas they are illustrated in FIG. 10.

FIG. 11 illustrates a fourth embodiment of the apparatus according to the invention.

FIG. 12 illustrates a modified version of the embodiment shown in FIG. 11.

FIG. 13 is a perspective view of the apparatus according to FIG. 11.

FIG. 14 illustrates a fifth embodiment of the apparatus according to the invention.

Figure 1:
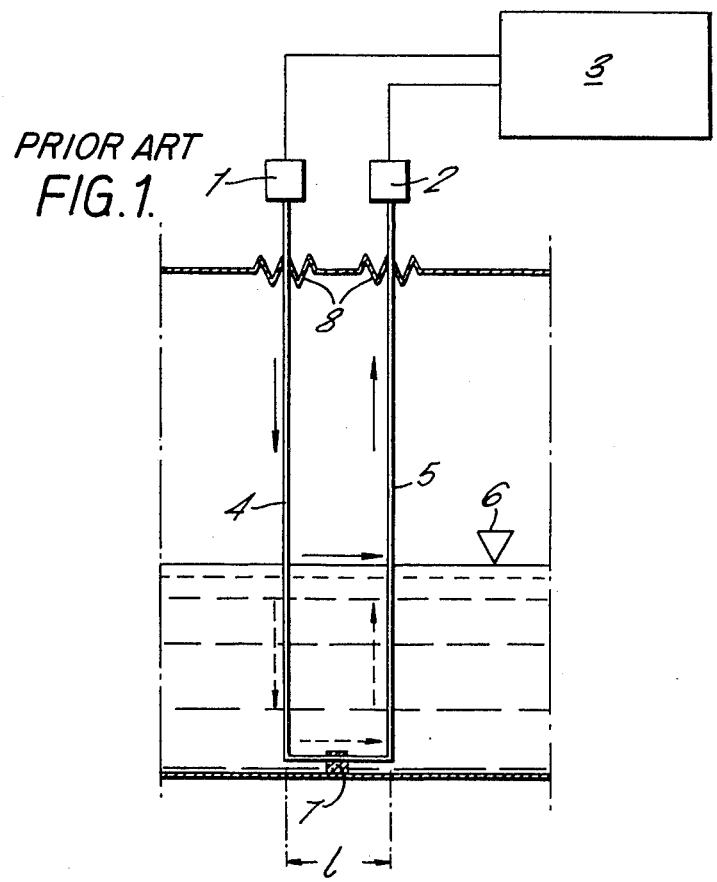
FIG. 1 illustrates the working principle of an apparatus according to the prior art.

FIG. 1 shows a section of a tank which is filled with a liquid and where the liquid surface is denoted by 6. The solid arrows indicate how the primary wave propagation takes place through an emitter device 4, the liquid surface 6 and a collector device 5. The dotted arrows indicate how a portion of the sound waves propagate further along the emitter device 4, are propagated through a coupling between the two devices 4 and 5 at their lower end and carried further along the collector device 5. The devices 4 and 5 are at their lower end connected by means of the said coupling and fixed to the bottom of the tank by means of a suitable device 7. The said devices 4 and 5 have a constant mutual distance "1". The emitter and collector devices are at the top of the tank connected to the tank by means of flexible lead through support devices 8, said devices 8 having a neglible wave propagation ability. If the said devices 4 and 5 are passed through the top of the tank at a point on these devices identical to a node for the sound waves, it is possible to dispense with the said devices 8.

The term node shall in the description hereinafter be considered as any suitable fixing point, the wave attenuating effect of which is a minimum. It may thus in this respect be used for the arrangement of combined suspension and wave transferring means at the top of the tank or at other places on the tank.

Figure 2:
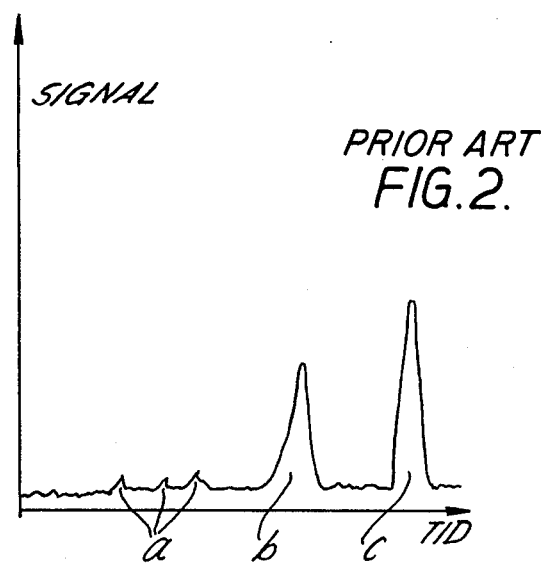
FIG. 2 illustrates a typical signal from the registration device.

The sound waves are provided by the device 1 which e.g. may be of a mechanical, electro-mechanical or piezo-electric type. By supplying the device 1 with energy precisely timed waves are provided in the emitter device 4, said waves being propagated to the collector device 5 primarily through the liquid surface and secondly through the coupling at the bottom of the tank. The waves which are transferred to the collector device 5 are registered by the device 2, said device e.g. being of a mechanical, electrical or piezo-electrical type. The time difference between the time for emission of the waves from the device 1 and the registration of the received waves at the device 2 may in a manner known per se be measured by a time measuring device 3. FIG. 2 illustrates how a typical output signal from the device 2 and from each device 2 in the other figures may look. The illustrated signal in FIG. 2 is only meant to serve as an example and is in no way limiting the invention. Referring to FIG. 2 the signals denoted by *a* indicate the registered wave propagations corresponding to spacing members between which may be connected the emitter device and collector device, reference numerals 4 and 5 of FIG. 1, reference numerals 4' and 5' of FIG. 3 respectively. The spacing members are not shown. b of FIG. 2 indicates the wave propagation at the liquid surface and c indicates the wave propagation at the said coupling at the lower end of the wave propagating devices 4, 4' and 5, 5' as shown in FIGS. 1 and 3.

By measuring also the second wave propagation, i.e. the one which is indicated by c in FIG. 2, a constant control of the wave propagation of the apparatus is achieved.

In FIG. 1 the apparatus is illustrated having two parallel arranged tubes, rods or the like 4 and 5 respectively, but it is of course possible to use e.g. several emitter devices 4 and possibly several collector devices 5.

Figure 3:
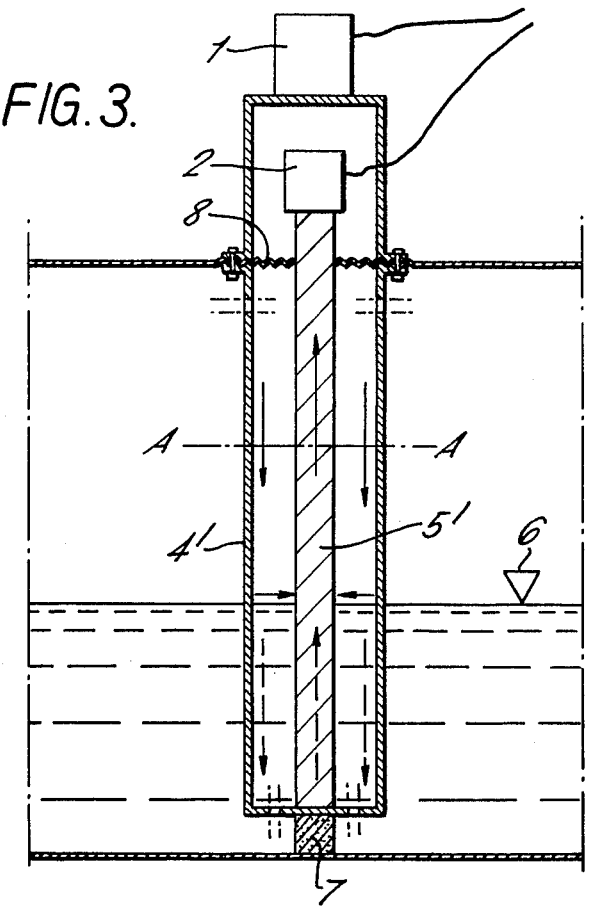
FIG. 3 illustrates a first embodiment of the apparatus according to the invention.
Figure 4:
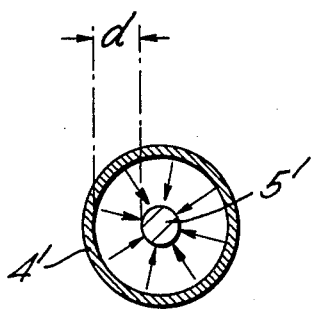
FIG. 4 illustrates a cross section through the apparatus according to FIG. 3 at A — A.

Referring to FIG. 3 a first embodiment of the present invention is shown wherein the substantial difference from the apparatus of FIG. 1 consists in that the emitter 4' and the collector 5' devices are arranged coaxially such that the opposite faces of the said devices exhibit a constant distance $d$, as shown in FIG. 4, such that the wave propagation distribution ideally is uniform. FIG. 4 illustrates the section A — A in FIG. 3. At the lower end of the apparatus, where a coupling is arranged as in FIG. 1, the apparatus is fixed to the bottom of the tank by means of a suitable device 7 which to a neglible extent is wave propagating. At its top the tank is, similarly to FIG. 1, provided with flexible devices 8. Ventilating holes are arranged in the emitter device 4' as indicated to permit the liquid to enter. It is of course possible to modify the embodiment shown in FIG. 3 by e.g. placing around the emitter device 4' a further collector device.

Figure 5:
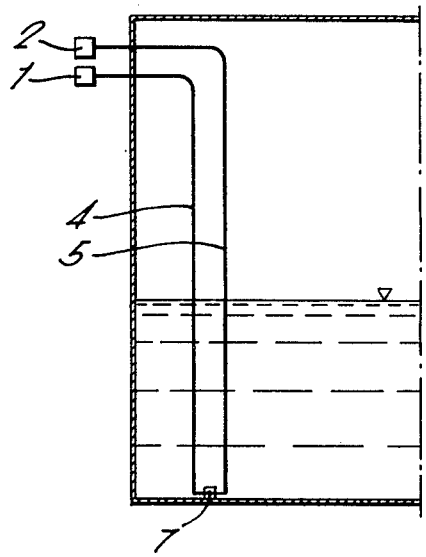
FIGS. 5 and 6 illustrate variants of the apparatus shown in FIG. 1.

FIG. 5 shows a cross section through a tank illustrating a modified embodiment of that shown in FIG. 1 and consisting of the said devices 1 and 2 arranged along the vertical side of the tank and connected with the said devices 4 and 5 through a suitable lead through in the tank wall and a horizontal to vertical transfer means.

Figure 6:
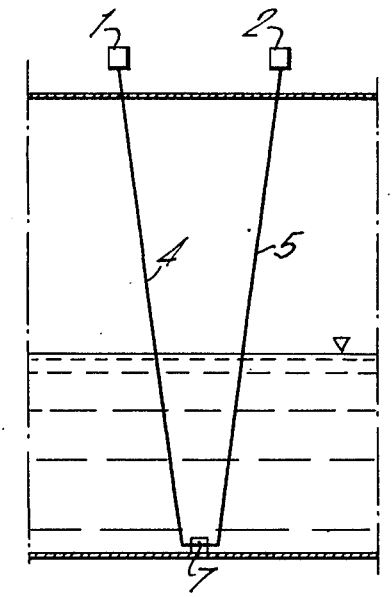

FIG. 6 shows another modified embodiment of that shown in FIG. 1 in order to illustrate how the said emitter and collector devices may be arranged at an angle to the vertical and relative to each other. The inclined position has certain advantages when the liquid level is low, since the attenuation of the wave propagation through the liquid is reduced when the wave propagation length through the said devices 4 and 5 respectively is increasing.

Figure 7:
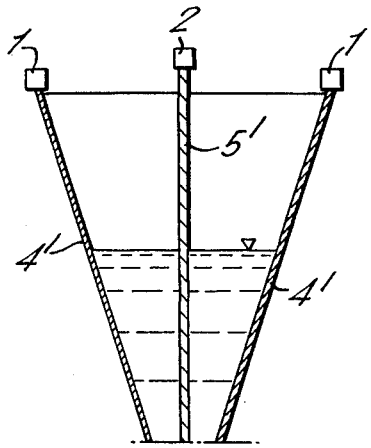
FIGS. 7 and 8 illustrate a second principal embodiment of the apparatus according to the invention, wherein one of the wave propagating media is comprised by the liquid container itself.
Figure 8:
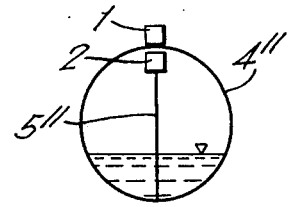

The embodiment shown in FIG. 7 is substantially a modification of the embodiment shown in FIG. 6, but with the important difference that the conical shaped liquid container serves as emitter device 4' and where a collector device 5' has been positioned coaxially therewith. Along the upper circumference of the tank sound wave providing devices 1 have been positioned. Referring to FIG. 8, it is shown a similar solution to that of FIG. 7, however with the tank having an oval cross section wherein the tank serves as emitter device 4'', whereas collector device 5'' has been positioned inside the tank.

Another embodiment of the apparatus according to the invention is illustrated in the FIGS. 9 and 10. The emitter and collector devices are denoted by 14 and 15. The said devices may have a U-formed horizontal cross section as shown, although other suitable profiles may be possible. The emitter device possesses a sound wave providing device 11 whereas the collector device 15 is provided with a sound wave receiving device 12. The latter devices 11 and 12 are for the sake of clarity not indicated in FIG. 9. Since the middle point on each of the said devices 14 and 15 may be considered as a node with respect to the emitted and received waves, the said devices may be connected together, e.g. by welding and be fixed to the wall of the tank by means of the fixing device 17. In FIG. 10 the said devices 14 and 15 are passed through the top face of the tank at the points 18 as indicated. The said points will for suitable positioning of the said devices 11 and 12 act as nodal points with regard to the wave propagation. A fixing of the apparatus to the top of the tank in this manner will thus not represent any substantial loss in wave effect. Arrangement of the apparatus according to the invention in this manner represents the substantial advantage that the apparatus is made inexpensive, simultaneously with the fixing problem to and inside the tank being minimized. Besides, the wave propagation distribution between the said emitter and collector devices 14 and 15 will be exceptionally good, which should be obvious from the cross section of FIG. 9. However it is clear that e.g. flexible or other suitable couplings may be used thereby to achieve a minimum wave attenuating effect at the transfer point. In particular for tanks or containers where the stored liquid is partly or substantially explosive, it is an absolute safety precaution that electrical connections or devices which may create sparking should not be present inside the tank. The solution according to FIGS. 9 and 10 overcomes these problems in an extremely simple and effective manner. The said devices 11 and 12 may advantageously be mechanical, electromechanical or piezo-electric.

FIGS. 11 and 13 illustrate a simplified embodiment of that shown in FIGS. 9 and 10. The apparatus consists of a combined emitter and collector device 19 as well as a combined sound wave emitting and receiving device 20. The apparatus is, like the apparatus in FIG. 9, fixed to the wall of the tank at a nodal point or in some other suitable manner. The tank is in general denoted by 23. The device 20 may e.g. consist of piezo-electric elements connected in a cascade fashion. The functioning of the device is such that it by external action provides sound waves being emitted in the device 19, said sound waves being to a certain extent reflected at the liquid surface and being picked up in turn by the said device 20 a certain period of time after the transmission of the sound waves. It is of course possible to use several devices 20 instead of just one, such that one in reality has e.g. two devices 11 and 12 as in FIGS. 9 and 10.

Referring to FIG. 12 a somewhat modified embodiment of the apparatus as shown in FIG. 11 is illustrated, wherein the apparatus is provided with sound wave propagating devices 19' and 21, as well as sound wave providing devices 22. The said devices 22 may e.g. form a part of a resonance circuit not shown, simultaneously with further possible detector devices 22' forming a part of the apparatus. The lead through through the tank wall may be performed by a suitable coupling 24, as indicated in FIG. 13. The said apparatus will thus be suitable for the measurement of absolute liquid level, since the apparatus is set to oscillate by means of the said devices 22 (not shown in FIG. 13) and as e.g. the liquid level in the tank is rising, the oscillations of the apparatus will substantially change in character when the liquid reaches the faces of the apparatus inside the tank. This may e.g. cause change in amplitude or frequency of the said oscillation circuit.

Such a measurement of liquid level will be particularly advantageous in the cases where the distance between the maximum liquid level and the top of the tank should be within a certain limit. A substantial advantage of the said solution is that no electric wires or connectors are inside the tank, which wires or connectors otherwise could increase the risk of a possible explosion. It is further an important advantage that no movable parts are inside the tank, like e.g. a float or the like.

FIG. 14 illustrates an embodiment of the invention, where two hollow tubes 4''' and 5''' constitute the emitter and collector devices of the apparatus, said emitter and collector devices being closed at their respective bottoms and connected with each other. The said tubes or devices 4''' and 5''' are preferably filled with a suitable oil or the like, and inside each device 4''' and 5''' sound wave providing devices 1' and sound wave receiving devices 2' are arranged. The said devices 1' and 2' may either be movable vertically and in parallel, or a number of such devices 1' and 2' may be fixed along the inside of the tube and by means of time multiplexing measuring the different liquid levels present. The devices 1' and 2' are by means of electrical wires 10 connected with a device 13 which may either provide for the simultaneous vertical displacement of the devices 1' and 2' simultaneously with registrating the wave propagation time and wave amplitude through the wires 10, said wires serving as suspension for the said devices 1' and 2', or alternatively serve as a multiplexing device in order to determine which set of devices 1' and 2' that corresponds to the liquid level measured. This embodiment of the apparatus is particularly suitable where e.g. a mixture of solid particles, water and oil are pumped into a collection tank, as e.g. will be the case when collecting oil spillage from tankers or during cleaning of tanks. In FIG. 14, A indicates air, B indicates oil, C indicates oil and water, D indicates water, and E indicates sediments. The apparatus may of course be used for other liquid compositions than those mentioned here. In the examples shown water, oil and water, and oil all exhibit different specific weight, which in turn means that the wave propagation will be different through these media. By moving the said devices 1' and 2' parallel inside the tubes or the said devices 4''' and 5''' , or by multiplexing between the number of devices 1' and 2', it will be possible to detect the border layers between the said liquids, whereby a correct indication is obtained with regard to how much water that possibly may be emptied through the valves 25 before oil is escaping from the tank. Thus a series of valves 25 may be placed above each other on the wall of the tank, such that oil is pumped out in one operation, oil and water in another operation and finally water. By providing the emitter and collector devices 4''' and 5''' with a medium 9, e.g. a suitable oil, the most powerful part of the sound wave distribution will lie betwen the previously mentioned devices 1' and 2'. There is thus provided an effective and simple manner for registrating the different liquid levels of a tank, container or the like. The devices 1' and 2' may suitably have approximately the same specific weight as the said medium 9. Since the said tubes 4''' and 5''' each are closed at the bottom and only open above the top of the tank, the electric wires 10 connected to the said devices 1' and 2' or an array of such devices 1' and 2' arranged along the inside of the said tubes, will not be in contact with the liquids contained in the tank, and there is therefore no risk for initiation of an explosion due to sparking. The apparatus may also be used in connection with control of e.g. pour concrete in supporting columns, supporting walls or the like or e.g. for detection of irregularities relating to contact with the surrounding medium. It will thus be possible to measure the level of the mass or concrete, possibly border layers which may constitute weak points in the construction, cavities, foreign substance or deviation in the consistancy of the mass.

In FIG. 14 the upper liquid level is indicated by 16. It is also obvious that it is possible within the scope of the invention to interchange the collector and emitter devices simultaneously with the said devices 1, 1', 11 and 2, 2', 12 being interchanged. Similarly it will within the scope of the invention be possible to arrange suitable spacing means between the emitter and collector devices, in order to ensure a fixed distance between the said devices. The spacing means may also serve as fixed reference points e.g. in connection with calibration of the apparatus.

Further modifications of the apparatus according to the invention will be obvious to the expert.

We claim:
1. In apparatus for measurement of the level of a substance in a container having a substantial depth, comprising a sonic wave propagating means secured to said container and having an emitter portion and a collector portion both extending substantially the entire depth of said container, from a position above the highest level of said substance to be measured to below the lowest level thereof to be measured, means for applying sonic waves to said emitter portion whereby said waves are propagated in and emitted from said emitter portion and are collected by and propagated in said collector portion, and means for detecting said collected waves to produce indications therefrom of the level of said substance on the basis of the relationship between said emitted and collected waves, the improvement wherein said means inducing sonic waves comprises emitter and collector portions each in the form of a rigid member capable of longitudinal wave propagation of substantially U-shaped horizontal section, and means for affixing said members to one another and to said container at the node point of said member, said means for applying said sonic waves and said means for detecting said waves being connected to said emitter portion and said collector portion at the top ends thereof.

2. The apparatus of claim 1, in which said emitter portion and said collector portion comprise the same common portion of said propagating means, and said means for applying said sonic waves and said means for detecting said sonic waves comprise a common transducer for applying sonic waves to, and detecting sonic waves from, said propagating means.

* * * * *